United States Patent [19]

Friese

[11] Patent Number: 5,133,456
[45] Date of Patent: Jul. 28, 1992

[54] LOCK RING FOR TAPE-LIKE RECORDING MEDIA WOUND AS A ROLL OF TAPE, IN PARTICULAR MAGNETIC TAPES

[75] Inventor: Joern Friese, Limburgerhof, Fed. Rep. of Germany

[73] Assignee: BASF Aktiengesellschaft, Ludwigshafen, Fed. Rep. of Germany

[21] Appl. No.: 656,535

[22] Filed: Feb. 19, 1991

[30] Foreign Application Priority Data

Mar. 3, 1990 [DE] Fed. Rep. of Germany ... 9002532[U]

[51] Int. Cl.$^5$ ............................................. B65D 85/671
[52] U.S. Cl. ........................................ 206/400; 206/53
[58] Field of Search ...................................... 206/53–55, 206/303, 400, 409

[56] References Cited

U.S. PATENT DOCUMENTS

| | | | |
|---|---|---|---|
| 2,440,853 | 5/1948 | Follick | 206/53 |
| 2,579,600 | 12/1951 | Murray | 206/53 |
| 2,993,588 | 7/1961 | Kulka | 206/53 |
| 3,124,243 | 3/1964 | Kulka | 206/53 |
| 3,141,550 | 7/1964 | Simmons | 206/53 |
| 3,357,547 | 12/1967 | Thoms | 206/53 |
| 3,371,882 | 3/1968 | Orlando | 206/400 |
| 3,437,196 | 4/1969 | Kulka | 206/53 |
| 4,736,845 | 4/1988 | Balderas et al. | 206/400 |

*Primary Examiner*—Jimmy G. Foster
*Attorney, Agent, or Firm*—Keil & Weinkauf

[57] ABSTRACT

A lock ring for tape-like or strip-like recording media wound as a roll of tape, in particular magnetic tapes, is provided with one or more resilient pressure elements for the free tape beginning. The pressure element can be advantageously used both in conjunction with an automatic self-threading ring and with conventional lock ring-only systems.

6 Claims, 3 Drawing Sheets

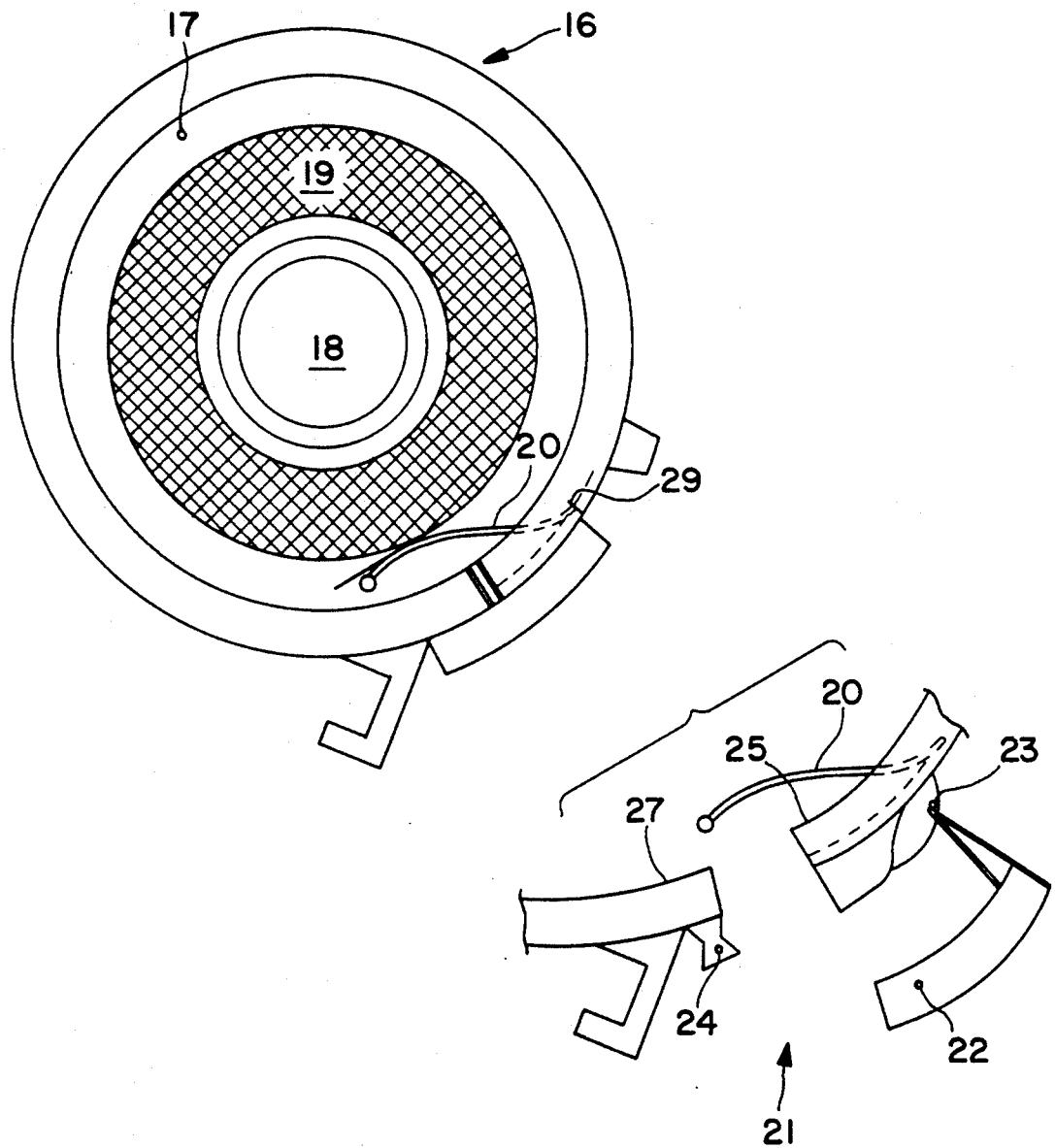

LOCK RING FOR TAPE-LIKE RECORDING MEDIA WOUND AS A ROLL OF TAPE, IN PARTICULAR MAGNETIC TAPES

The present invention relates to a lock ring for tape-like recording media wound as a roll of tape, in particular magnetic tapes, said lock ring being capable of being opened for release of the roll of tape.

Usually with rolls of tape wound on flanged wheels, lock rings of this type close the otherwise accessible open space between the flanges, in order to protect the tape and the roll of tape from damage and soiling and to prevent emergence of the tape. These lock rings are also generally provided with hooks for suspension and archiving.

A particular type of such lock rings is the easy load ring (referred to below as EL ring for short), which is easy to load by a procedure in which the ring is opened and the beginning of the tape is fed by a self-threading mechanism through an orifice in the lock ring to a second reel.

These EL rings are used in computer tape drives and are capable of releasing the reel by a lock means which permits the circumference of the EL ring to be increased after said lock means has been released, the overlapping ring end parts, however, remaining positively engaged with one another, so that the loose beginning of the tape is caused to float by a coupled compressed air system so that it is passed out of an open window in the EL ring as the reel slowly starts to rotate.

Since the roll of tape is formed by winding the tape under tension, with such rolls of tape and lock rings there is always the danger of unwinding the outer tape layers and, at worst, folding and bending the tape, which may lead to recording and playback problems.

It is an object of the present invention to improve the lock rings defined at the outset.

We have found that this object is achieved, according to the invention, by a lock ring for tape-like recording media wound as a roll of tape, in particular magnetic tapes, said lock ring being capable of being opened for release of the roll of tape, if the lock ring is provided with a resilient pressure element which rests against the outer circumference of the roll of tape when the lock ring is closed and is arranged a distance away from the circumference of the roll of tape when the lock ring is opened.

This ensures, in an advantageous manner, that the tape cannot unwind from the roll of tape, even in the event of forces due to impact and shaking, with the result that creasing of the tape or muddling of the tape, which particularly in the case of the EL ring would lead to difficulties in automatic withdrawal and threading, are avoided.

In a practical embodiment, the resilient pressure element may be a spring element which is fastened on at least one side to the lock ring and which consists of, for example, spring wire or a plastic spring.

The spring element may advantageously be present in a slot or in a groove of the lock ring when the lock ring is opened.

In a practical embodiment, the lock ring may consist of parts which are connected to one another and are displaceable toward one another and which can be partially pushed one over the other, and the spring element is arranged in the overlap region.

This advantageous embodiment is an EL ring in which the overlap of the ring parts is retained even after opening.

In another embodiment of the lock ring, the resilient pressure element essentially consists of a contact pressure part and a ramp part, wherein the ramp part is arranged between those ring parts of the lock ring which have not been pushed one over the other.

Thus, automatic removal of the pressure element from the circumference of the roll of tape is achievable when the lock ring is opened and automatic engagement of the resilient pressure element with the circumference of the roll of tape is achievable on closure by actuating the ramp part, these being achieved by means of a very simple embodiment of the resilient pressure element itself.

In an advantageous embodiment, the resilient pressure element is a spring element, in particular a spring wire, which is fastened by at least one end to one of the displaceable parts in the overlap region. In another variant, the resilient pressure element is connected at each end to one of the displaceable parts. In practice, the resilient pressure element may consist of a plastic strip which is produced as a single piece with the lock ring.

This permits particularly simple production of the lock ring with integrated pressure element.

Embodiments of the invention are described below and shown in the drawing.

In the drawing,

FIG. 2 shows a tape reel having a dividable, closed lock ring,

FIG. 2A shows a partial view of the lock ring in FIG. 2, with the locking mechanism open.

Figure 1:
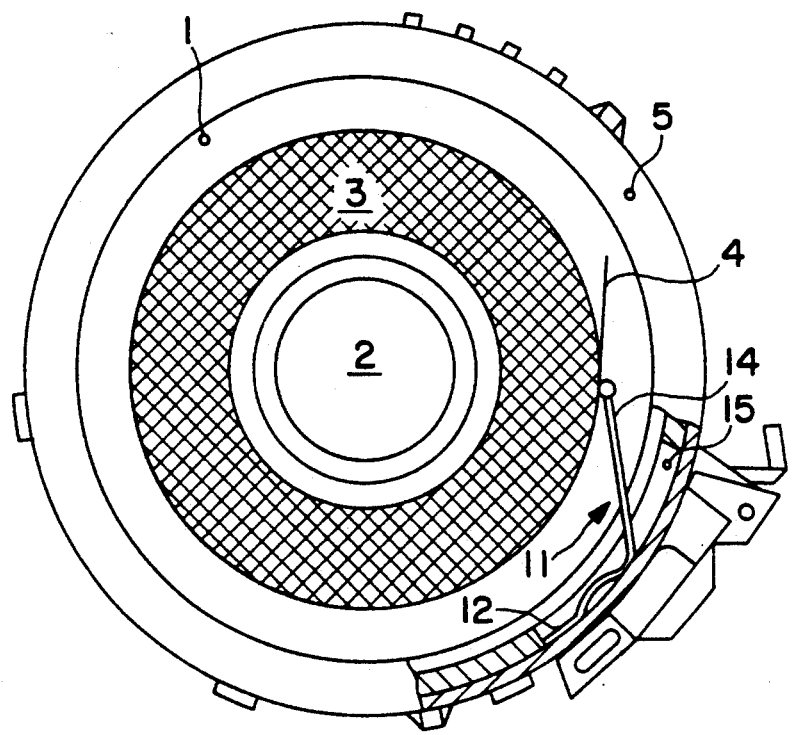
FIG. 1 shows a tape reel having a closed EL ring with a tape pressure part.

A tape reel having flanges 1 and circular orifice 2 carries a roll of tape 3 having a tape beginning 4. The circumference of the flange 1 is closed on the outside by an EL ring 5, which is described in principle in U.S. Pat. No. 3,371,882. The EL ring 5 has a locking mechanism 6, referred to below as lock 6 for short, which connects the ring parts 7 and 8, which overlap or are pushed one over the other in the region of the tapered part 9. A tension lever 10 effects the closing and opening operations.

A resilient pressure element 11 is fastened with a fastening end 12 on tapered part 9 of ring part 8, for example in a hole, and is located with the connecting part between the pushed-over ring part 7 and the part 9. This is followed by a ramp part 13, which continues in the contact part 14 of the pressure element 11.

Figure 1A:
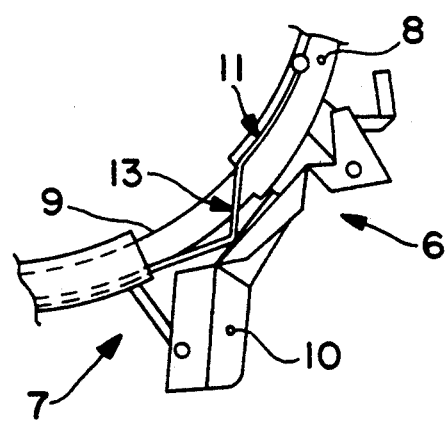
FIG. 1A shows a partial view of FIG. 1, with the EL ring open.

Starting from the position of the resilient pressure element 11 in FIG. 1A, where, except for its ramp part 13, it is virtually completely inside the ring parts 7 and 8, ramp 13 is subjected to a load by pressure on the tension lever 10 or simply by pushing together the overlapping parts 7 and 9, so that the contact part emerges from a slot orifice 15 in the tapered part 9 and moves toward the roll of tape and comes to rest against its circumference. In the case of EL ring 5, a slot is required in part 9, since the latter is hollow because of the pneumatic threading of the tape end, which is shown schematically in FIG. 1, and thus provides a space 15 for accepting the pressure element 11. Such a space 15 should always be provided when the resilient pressure element 11, in its position when fully or partially extended, may hinder running of the tape or damage the tape.

Another embodiment of a dividable lock ring 16 which does not have the function of EL ring 6 is shown in FIG. 2. The flanged reel 17 having circular orifice 18 carries a roll of tape 19, once again consisting of a tape-like or strip-like recording medium, such as a film, magnetic tape, punched tape, etc. In principle, it is also possible for an unsupported roll of tape 19 on a flangeless hub to be held together by means of a lock ring, which in this case would have to be matched to the diameter of the roll of tape, but better than shown, and the lock ring should have a greater width in order partly or completely to encompass the lateral surfaces of the roll of tape. In such an embodiment, too, a resilient pressure element according to the invention can advantageously be used.

The resilient pressure element 20 is fastened on one side to lock ring 16 as in the embodiment in FIG. 1. Here as well as there, it can, however, be produced as a single piece with the ring when the latter is produced from plastic.

Figures 3, 3A:
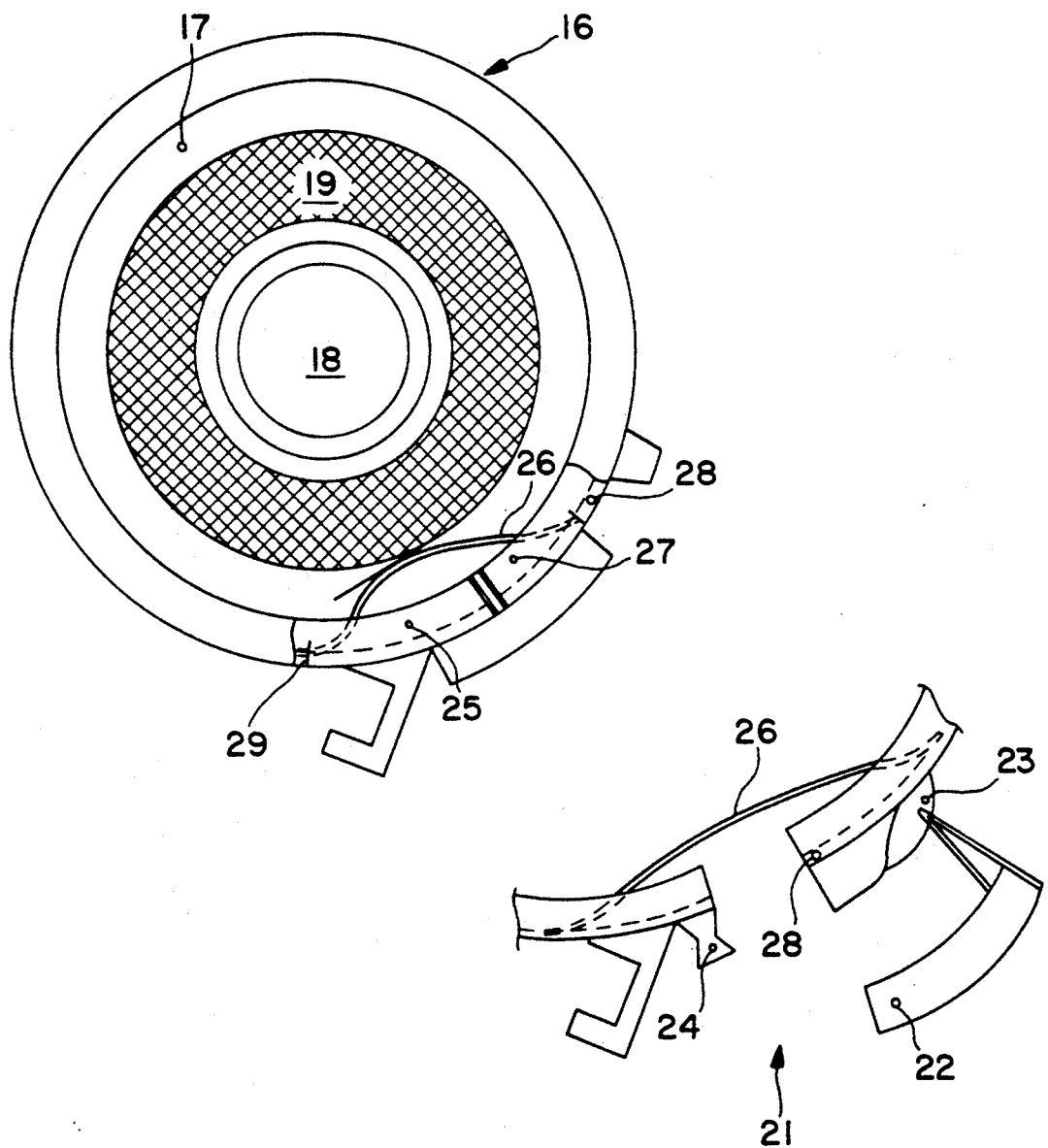
FIG. 3 shows a tape reel having a nondividable lock ring and FIG. 3A shows a partial view of the lock ring in FIG. 3, with the locking mechanism open.

FIG. 2A shows the opened part of the lock ring 16 whose lock 21 essentially consists of a tension lever 22, a joint 23 and a clamping cam 24. The parts 25 and 27 of the opened lock ring 16 are separable here. FIGS. 3 and 3A show the arrangement from FIGS. 2 and 2A in virtually identical form. The difference is a resilient pressure element 26 which is suitably fastened on both sides, i.e. to each of the separable ring parts 25 and 27, or is produced as a single piece therewith. As a result of the undetachable connection of the pressure element 26 on both sides, the lock ring 16 has become nondividable.

The resilient pressure elements 11, 20 and 26 can be produced from spring material, metal or plastic. Their fastening is dependent on the material and can be effected in a suitable manner, for example by means of rivets, clamps 29, etc. (for example, in FIGS. 2 and 3, fastening to outer ring 28 indicated by dashed line). In the case of plastic springs, production as a single piece is also advantageous, as indicated, for example, in FIG. 3A by omission of the fastening element 29. The spring force should be adjusted to the material and the sensitivity of the recording medium.

Practical embodiments of the invention which have been described can be produced economically and have proven excellent in practice, in particular in connection with the handling of valuable computer tapes, handling being simplified and damage being considerably reduced.

I claim:

1. A lock ring for tape recording media wound as a roll of tape, said lock ring being capable of being opened for release of the roll of tape wherein the lock ring is provided with a resilient pressure element which rests against the outer circumference of the roll of tape when the lock ring is closed and is arranged a distance away from the circumference of the roll of tape when the lock ring is opened and wherein the lock ring consists of parts which are connected to one another and are displaceable toward one another and which can be partially pushed one over the other so as to overlap one another, and wherein the resilient pressure element is arranged in the overlap region and consists of a contact part and a ramp part, the ramp part being arranged between the parts of the lock ring which have not been pushed one over the other.

2. A lock ring as claimed in claim 1, which has a slot or groove in which the resilient pressure element is located when the lock ring is opened.

3. A lock ring as claimed in claim 1, wherein the resilient pressure element is a spring element which is fastened by at least one end to one of the displaceable parts in the overlap region.

4. A lock ring as claimed in claim 1, wherein the resilient pressure element is a spring wire and is fastened on one side to one of the separable parts of the lock ring.

5. A lock ring as claimed in claim 1, wherein the resilient pressure element is connected at each end to one of the separable parts.

6. A lock ring as claimed in claim 1, wherein the resilient pressure element consists of a plastic strip which is produced as a single piece with the lock ring.

* * * * *